Patented Oct. 31, 1933

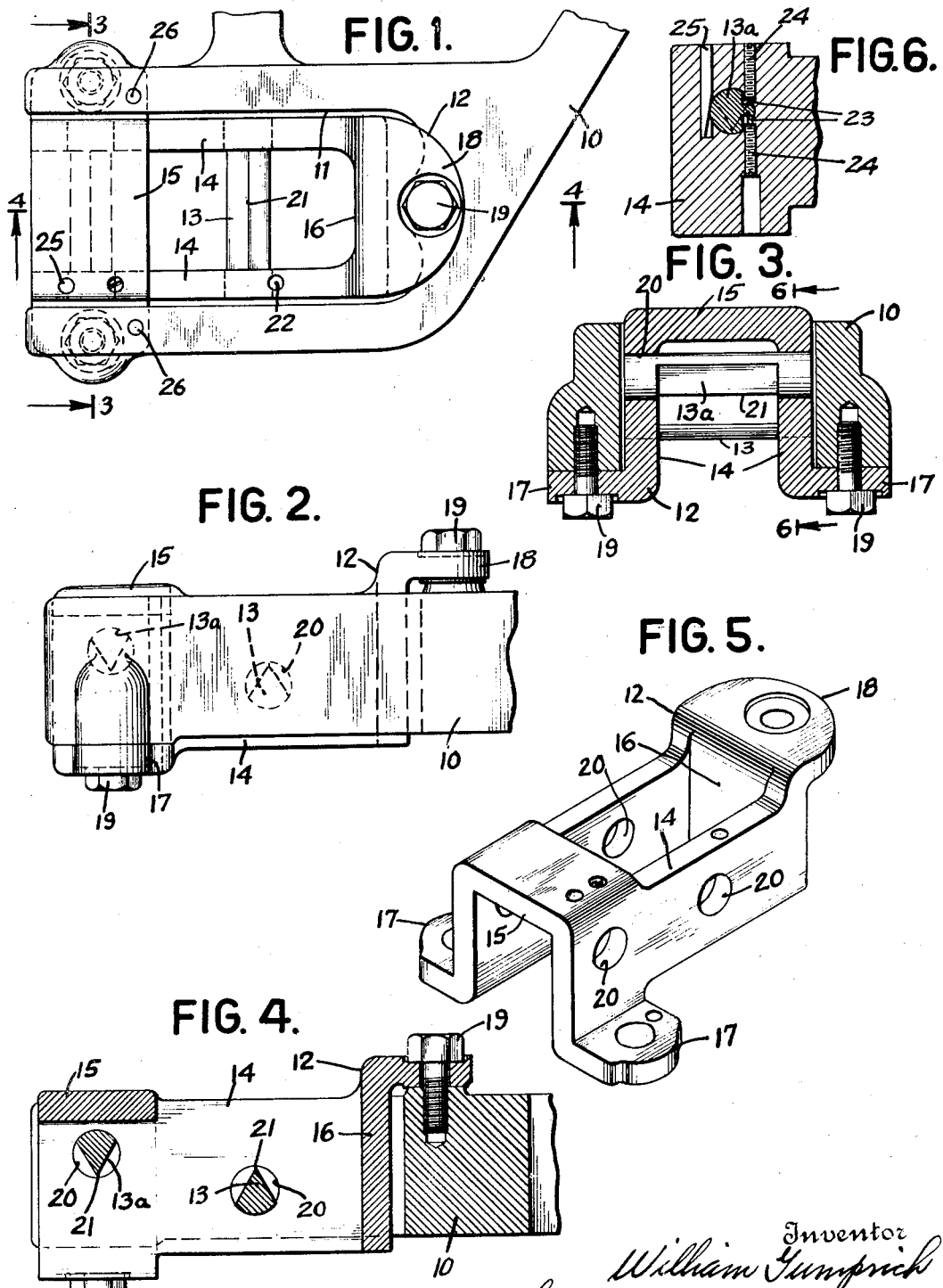

1,933,259

UNITED STATES PATENT OFFICE 1,933,259

SCALE BEARING MEMBER

William Gumprich, Binghamton, N. Y., assignor, by mesne assignments, to International Business Machines Corporation, New York, N. Y., a corporation of New York Application May 19, 1930. Serial No. 453,550

7 Claims. (Cl. 308—2)

The present invention relates to weighing scales in general and particularly to improvements in the manner of attaching the pivot members or knife edges to the scale lever.

It is the broad object of the present invention to provide an improved mounting for the pivot members of a scale which is cheaper to construct and easier to assemble and adjust.

The primary object of the present invention is to provide an improved support for the knife edges in which the knife edges are mounted in a detachable structure adapted to be removably mounted upon the scale lever.

It is customary to provide the levers of weighing scales with a number of pivot members comprising knife edges. The pivot members may be formed as an integral part of the scale lever or composed of detachable members formed with knife edges; usually the latter construction is preferred. When the knife edges are formed integral with the scale lever it is found to be an extremely difficult and tedious operation to machine the knife edges correctly and in proper alignment and, in order to avoid the expense and difficulty of the extremely careful machining required under such circumstances, the practice has been to form the knife edges in removably and adjustably mounted members.

Customarily the knife edges are formed in cylindrical pieces of metal which are carried in suitable holes formed in the scale lever. The foregoing construction results in some improvement, however, it has been found by experience to be difficult to accurately position the mountings for the knife edges owing to the difficulty of locating the mountings upon the scale lever. The holes for receiving the pivot members must be drilled horizontally in exact alignment in the scale lever and are difficult to locate properly.

The present invention contemplates mounting the knife edges in a removable block which is relatively much easier to machine and drill accurately and may be more accurately positioned on the scale lever. This construction permits adjustment of the knife edges previously to mounting the block upon the scale lever. The block can be mounted on the scale lever upon flat surfaces which may be machined and ground very easily and accurately, the only holes which must be drilled accurately being vertical holes to receive dowel pins for aligning the block. Such holes can be located without difficulty by means of suitable jigs or fixtures permitting rapid and cheap manufacture of the scale levers in quantity without the use of highly skilled labor. The same is true of the fulcrum block, since it is small in size compared to the scale lever, permitting a closeness and accuracy of fit which is not easily attainable when handling large castings.

Other objects and advantages will be pointed out or become apparent in the following specification and claims and in the accompanying drawing, which, by way of illustration, show what is at present considered a preferred embodiment of the invention.

In the drawing:

Figure 1 is a plan view including a portion of a scale lever showing the mode of attachment of the present invention.

Figure 2 is a side elevation of the arrangement illustrated in Figure 1.

Figure 3 is a vertical section on the line 3—3 of Figure 1.

Figure 4 is a vertical section on the line 4—4 of Figure 1.

Figure 5 is a perspective view of the fulcrum block.

Figure 6 is a vertical section on the line 6—6 of Figure 3.

The numeral 10 represents the scale lever which is of well-known construction and is provided with a U-shaped bifurcation or recess 11 adapted to receive a member 12 hereinafter to be termed the fulcrum block.

The fulcrum block 12 is adapted to carry pivot members 13 and 13a and is preferably composed of a single piece of metal including substantially parallel side walls 14, a top wall 15, and an end wall 16. The fulcrum block is mounted upon the lever 10 by means of lugs 17 and 18 attached, respectively, by means of screws 19, to the lower front edges and to the upper rear edge of recess 11.

The members 13 and 13a are supported in holes 20 formed in the walls 14 of fulcrum block 12 and are provided with knife edges 21 which cooperate with suitable bearing blocks in a well-known manner. The member 13 is locked in place by means of a taper pin 22 which firmly wedges the member in its supporting hole 20.

The member 13a is provided at its right end (Fig. 3) with shoulders 23 (Fig. 6) abutting against the ends of set screws 24 by means of which the member may be rocked about its axis in either direction for the purpose of adjusting the knife edge. After the member 13a has been adjusted by manipulation of the screws 24 a taper pin 25 is driven home thereby wedging the member 13a firmly in place. In order to ensure the proper alignment of the fulcrum block upon the lever 10 a number of dowel pins such as 26 may be provided. If desired, the member 13 may be constructed similarly in order to permit adjustment of the knife edge.

The foregoing construction permits careful adjustment of the knife edges in the pivot members previously to mounting the fulcrum block on the scale lever. The holes for the dowel pins 26 as well as the holes for the members 13 and 13a may be very accurately positioned so that the knife edges 21 will be in correct alignment when the fulcrum block is attached to the scale lever. The only surfaces on the scale lever which must be accurately machined are the surfaces in contact with the lugs 17 and 18, and it will be obvious that these surfaces and the under surfaces of the lugs can be ground to correct alignment without difficulty or great expense. Furthermore, the construction permits correction of slight inaccuracies of manufacture by placing shims under the fastening screw lugs.

The scale lever 10 would in practice probably be provided with two or more of the fulcrum blocks 12 and the knife edges on one would have to be in exact alignment with the knife edges of the other after placement on the lever, therefore it will be readily perceived that it is imperative that the fulcrum blocks be carefully aligned. It will be clear that it would be a difficult matter as well as an expensive operation to accurately drill horizontal holes in perfect alignment in a large and heavy scale lever, consequently the advantages of the present invention over the former construction are apparent.

The present invention, for convenience in description and to assist in a clear understanding of the principles involved, has been shown as applied to a specific scale lever and in a specific manner. However, it is not desired to limit the scope of the invention to the precise embodiment shown as it is capable of adaptations and variations in practice all within the scope of the following claims.

I claim:

1. A device for attachment to a scale member having a recess, comprising a block which is removable as a unit from the scale member to which it may be attached, said block being provided with substantially parallel side walls to carry pivots for a second scale member, top and end walls connecting said side walls, and lugs on said block extended at an angle to said side walls adapted to be secured to the first named scale member to hold the block in the recess of the latter member.

2. As a sub-combination, a unitary block for use in scales, comprising a pair of parallel walls, integrally joined in spaced relation by an end wall, said sides having means for receiving scale pivots, a lug extending transversely from each side and from one of the end walls of said block for receiving securing means for attaching the block to a scale member.

3. In combination, a scale member provided with a bifurcated portion formed of parallel furcations; a pivot block mounted in said scale member and within said bifurcation, said block having a pair of lugs extending transversely of the block and adapted to be secured to the lower horizontal edges of said furcations and a third lug extending transversely of an end wall of said block and adapted to be secured to the upper edge of the scale member adjacent the closed end of said bifurcation; and members for fastening said lugs to said scale member.

4. The invention set forth in claim 3 wherein the lower edges of the furcations are enlarged to receive the fastening members for the cooperating lugs.

5. In combination, a scale member provided with a bifurcation comprising vertical parallel walls extending from said member, and a one-piece pivot block secured to said member and nested within said bifurcation, said block having side walls parallel with the walls of the bifurcation, a horizontally extending end wall joining said side walls at one end of the block, and a vertically extending wall joining said side walls at the other end of the block.

6. In combination, a scale member having a recess formed therein, and a removable pivot block mounted in said recess and adapted to be detached from said member as a unit comprising substantially parallel and vertical side walls integrally joined by a vertical end wall and adapted to carry a scale pivot element, said side walls being provided with vent-over lugs secured to the edges of the bifurcation.

7. In combination, a scale member having a bifurcation comprising vertical parallel walls extending from said member, and a pivot block detachably nested within said bifurcation; said pivot block having side walls parallel with the walls of the bifurcation, a horizontally extending end wall joining the side walls at one end of the block, a vertically extending wall joining said side walls at the other end of the block, a pair of lugs each extending transversely of the vertical wall and secured to the upper edge of the bifurcation adjacent the closed end of the bifurcation.

WM. GUMPRICH.